(12) United States Patent
Nakamichi

(10) Patent No.: US 11,237,420 B2
(45) Date of Patent: Feb. 1, 2022

(54) DISPLAY DEVICE HAVING FIXING MEMBER

(71) Applicant: SHARP KABUSHIKI KAISHA, Sakai (JP)

(72) Inventor: Kazuki Nakamichi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 25 days.

(21) Appl. No.: 16/872,298

(22) Filed: May 11, 2020

(65) Prior Publication Data

US 2020/0363672 A1 Nov. 19, 2020

Related U.S. Application Data (60) Provisional application No. 62/847,324, filed on May 14, 2019.

(51) Int. Cl.
*G02F 1/1333* (2006.01)

(52) U.S. Cl.
CPC .... *G02F 1/13338* (2013.01); *G02F 1/133308* (2013.01); *G02F 1/133331* (2021.01)

(58) Field of Classification Search
CPC ...... G02F 1/133; G02F 1/1333; G02F 1/1335; G02F 1/1337; G02F 1/1339; G02F 1/1368; G02F 1/1343; G02F 1/13338; G02F 1/133308; G02F 1/133331; G06F 1/16; G06F 3/01; G06F 3/041; G06F 3/042; G06F 3/043; G06F 3/044; F21V 7/04; F21V 8/00; F21V 15/01; H04M 1/00; H04M 1/02
See application file for complete search history.

(56) References Cited

U.S. PATENT DOCUMENTS

2009/0322983 A1* 12/2009 Hashino ............ G02F 1/133615
349/61
2014/0063707 A1* 3/2014 Itaya ...................... G06F 1/1601
361/679.01

FOREIGN PATENT DOCUMENTS

JP H10-240441 A 9/1998

* cited by examiner

*Primary Examiner* — Chanh D Nguyen
*Assistant Examiner* — Nguyen H Truong
(74) *Attorney, Agent, or Firm* — ScienBiziP, P.C.

(57) ABSTRACT

A liquid-crystal display that includes a liquid-crystal module and a touch panel covering the liquid-crystal module. The liquid-crystal display includes a holder extending along the outer end of the liquid-crystal module, the holder holding the touch panel in a state of covering the liquid-crystal module. The liquid-crystal display includes a double-faced tape disposed between a surface of the touch panel and a surface of the holder facing each other, the double-faced tape fixing the touch panel and the holder together. The double-faced tape includes multiple segments continuously disposed in a direction where the holder extends, the segments being mutually separable.

11 Claims, 7 Drawing Sheets

DISPLAY DEVICE HAVING FIXING MEMBER

CROSS-REFERENCE TO RELATED APPLICATION

The present application claims priority from Provisional Application 62/847,324, the content to which is hereby incorporated by reference into this application.

TECHNICAL FIELD

The present invention relates to a display device.

BACKGROUND ART

Japanese Patent Application Laid-Open No. 10-240441 (Patent Literature 1) describes a conventionally known display device. Patent Literature 1 discloses that the display device is a touch panel with an input substrate and fixing substrate joined together in a peripheral region via an adhesive layer. The adhesive layer has a rectangular frame shape.

SUMMARY OF INVENTION

Technical Problem

Unfortunately, for a relatively large display device (e.g., a TV set) that has the configuration disclosed in Patent Literature 1 and whose panels (e.g., an input substrate and a fixing substrate) stand upright, if part of the adhesive layer peels, the peeled part can be enlarged by the weight of the input substrate, and the input substrate can thus peel from the fixing substrate to drop off.

In view of such a problem, it is an object of the present invention to provide a display device capable of avoiding panel peeling.

Solution to Problem (1) To solve the above problem, one preferred embodiment of the present invention provides a display device that includes a display panel and a cover panel covering the display panel. The display device includes the following: a holder extending at least along an outer end of the display panel, the holder holding the cover panel in a state of covering the display panel; and a fixing member disposed between a surface of the cover panel and a surface of the holder facing each other, the fixing member fixing the cover panel and the holder together. The fixing member includes a plurality of segments continuously disposed in a direction where the holder extends, the plurality of segments being mutually separable.

(2) In addition to Configuration (1), the display device according to another preferred embodiment of the present invention is configured such that the fixing member includes a plurality of joints, each of the plurality of joints joins the segments adjacent to each other, and a plurality of slits, each of the plurality of slits extending in a direction intersecting with the direction where the holder extends.

(3) In addition to Configuration (2), the display device according to still another preferred embodiment of the present invention is configured such that each of the plurality of slits extends at least from an outer end of the holder toward an inner end of the holder.

(4) In addition to Configuration (2) or (3), the display device according to further another preferred embodiment of the present invention is configured such that the plurality of slits includes an outer slit extending from an outer end of the holder toward an inner end of the holder, and an inner slit extending from the inner end of the holder toward the outer end of the holder.

(5) In addition to any one of Configurations (2) to (4), the display device according to yet another preferred embodiment of the present invention is configured such that each of the plurality of slits extends to a half or more of a distance of the fixing member in a direction intersecting with the direction where the holder extends.

(6) In addition to any one of Configurations (2) to (5), the display device according to further another preferred embodiment of the present invention is configured such that the plurality of slits arranged in the direction where the holder extends, and a pair of the plurality of slits adjacent to each other are mutually distant by more than a distance that is twice as great as a width of the at least one slit.

(7) In addition to any one of Configurations (1) to (6), the display device according to still yet another preferred embodiment of the present invention is configured such that the display panel includes a liquid-crystal panel having a liquid crystal, and that the cover panel is a touch panel that detects a position where a position-input element has performed position-input.

Advantageous Effect of Invention

The present invention can provide a display device capable of avoiding panel peeling.

DESCRIPTION OF PREFERRED EMBODIMENTS

First Preferred Embodiment

This preferred embodiment describes a liquid-crystal display (i.e., display device) 10 that is installed in a TV set and has a touch panel, for instance. In each drawing, the liquid-crystal display 10 is in an upright position; moreover, in the board surface of the liquid-crystal display 10, the horizontal direction corresponds to X-direction, and the vertical direction corresponds to Y-direction. A direction orthogonal to these X and Y planes (i.e., the board-thickness direction of the liquid-crystal display 10) corresponds to Z-direction. Furthermore, with reference to FIG. 2, the left side in the Z-direction is the front of the liquid-crystal display 10, and the right side in the Z-direction is the back of the same. Herein, the liquid-crystal display 10 is rectangular when viewed from the Z-direction.

Figure 1:
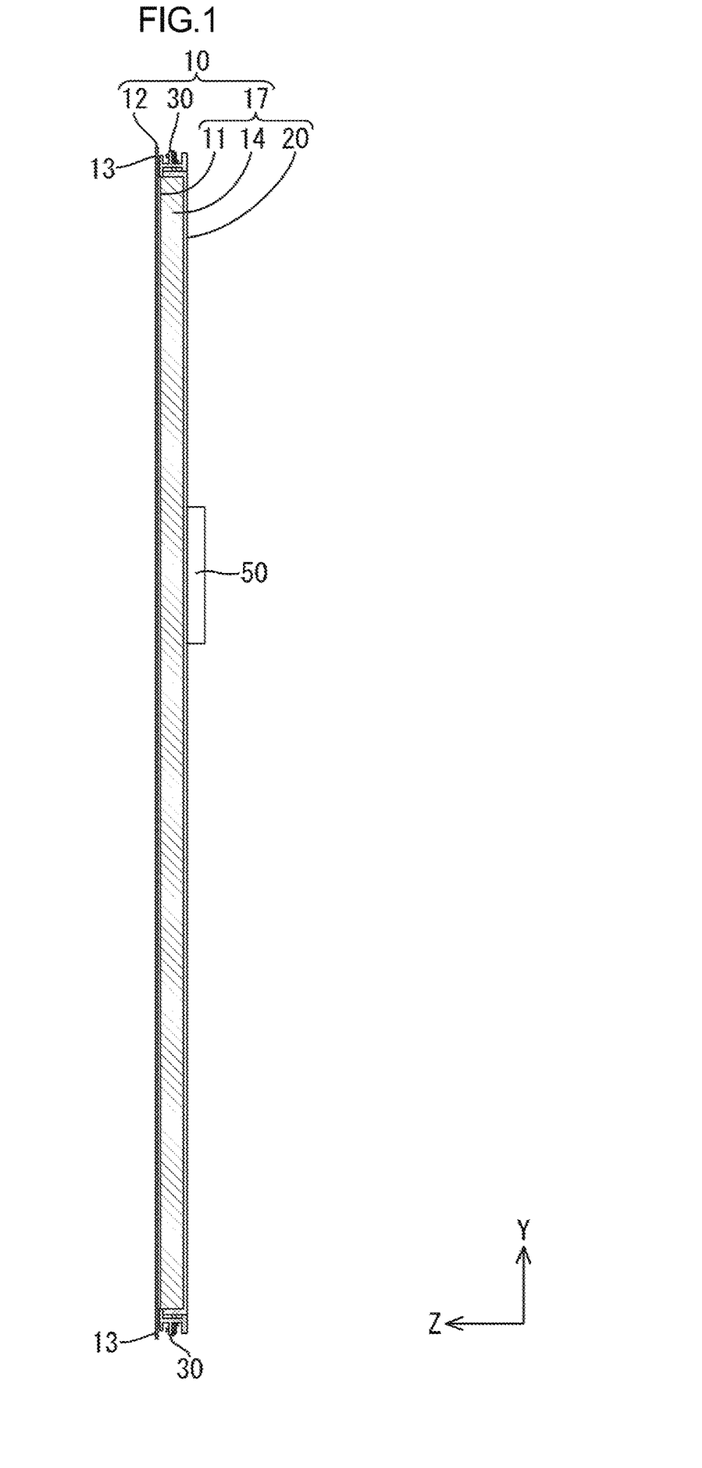
FIG. 1 is a vertical cross-sectional view of a liquid-crystal display according to a first preferred embodiment.
Figure 2:
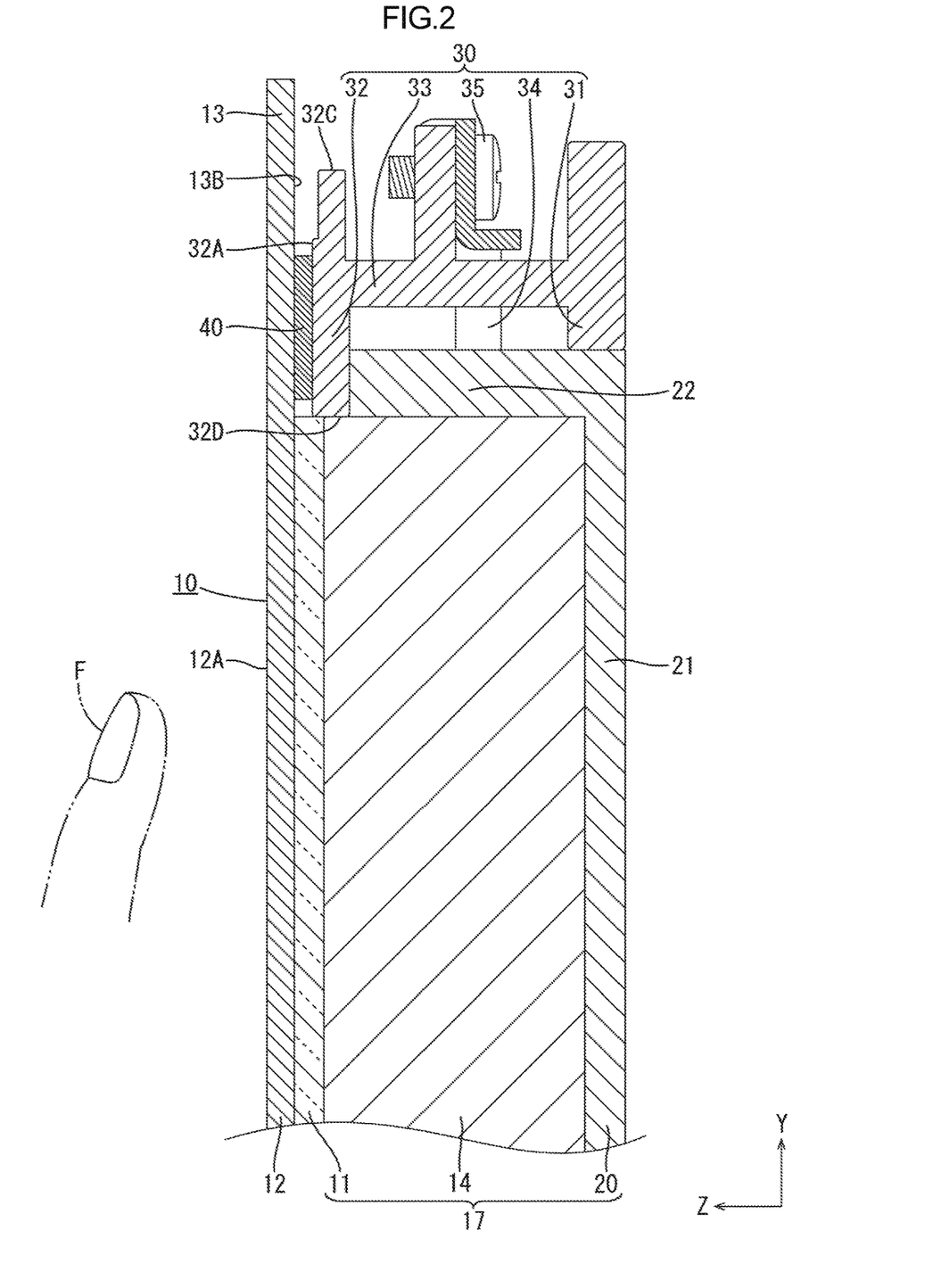
FIG. 2 is an enlarged cross-sectional view of the upper end of the liquid-crystal display.

As illustrated in FIGS. 1 and 2, the liquid-crystal display 10 includes a liquid-crystal module (i.e., display panel) 17, a touch panel (i.e., cover panel) 12 covering the liquid-crystal module 17 from forward, and a holder 30 holding the touch panel 12 in a state of covering the liquid-crystal module 17. The liquid-crystal module 17 and the touch panel 12 are plates each composed of multiple rectangular layers stacked in the Z-direction. Hereinafter, these staked layers are collectively referred to as a panel. The liquid-crystal module 17 includes the following: a liquid-crystal panel 11 capable of image display; a backlight device (i.e., illumination device) 14 that is disposed on the back of the liquid-crystal panel 11, and supplies light for image display, from the back of the liquid-crystal panel 11; and a chassis 20 that is a casing having an open front, and contains the liquid-crystal panel 11 and backlight device 14. Disposed on the back of the liquid-crystal module 17 is a control substrate 50 that controls the liquid-crystal module 17, touch panel 12, and other components.

The touch panel 12 is provided in order for a user of the liquid-crystal display 10 to input (i.e., perform a touch operation) position information in accordance with an image displayed on the liquid-crystal panel 11. For instance, when the user brings his/her finger F (i.e., a position-input element, which is a conductor), close to a front surface 12A of the touch panel 12, the touch panel 12 detects the input position on the basis of a capacitance formed between a position-input unit, disposed in the touch panel 12, and the finger F. It is noted that how the touch panel 12 detects the input position is non-limiting; various detecting methods can be applied.

The touch panel 12 includes non-display portions 13 extending off regions overlapping with the liquid-crystal panel 11. Each non-display portions 13 is a part of a frame where the image on the liquid-crystal panel 11 is invisible. The touch panel 12 also includes a protector (such as a cover lens or cover glass) disposed over its front. The protector is a glass plate that protects the touch panel 12 itself or liquid-crystal module 17.

The chassis 20 has a bottom 21 having a plate-shape that is a size larger than the backlight device 14, and has walls 22 standing upright from the outer ends of the bottom 21 toward the front. The bottom 21 supports and fixes the backlight device 14 from backward. Each wall 22 stands upright to reach a front portion 32 of the holder 30, which will be described later on.

Figure 3:
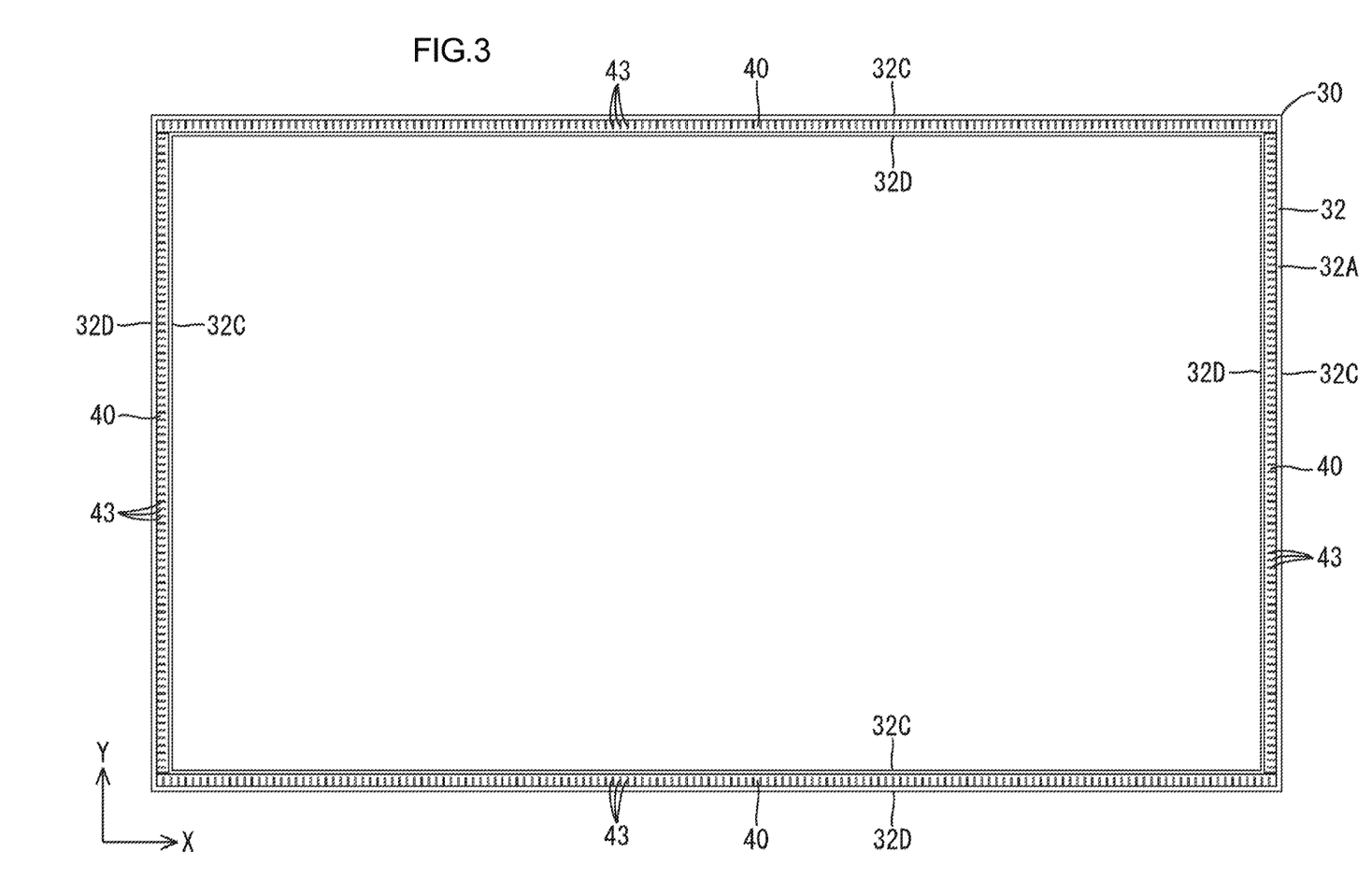
FIG. 3 is a front view of a holder and double-faced tape.

As illustrated in FIGS. 1 to 3, the holder 30 is made of metal, such as aluminum. In addition, the holder 30 is disposed on the back of the non-display portions 13 of the touch panel 12, and is a frame extending along the outer end of the liquid-crystal module 17 (herein, the outer end of the liquid-crystal module 17 is a portion adjacent to the walls 22; in FIG. 2 for instance, the outer end is the upper end of the liquid-crystal module 17 in the Y-direction). The holder 30 has longer sides extending in the X-direction, and shorter sides extending in the Y-direction. The holder 30 holds and supports the liquid-crystal module 17 from the outer end of the liquid-crystal module 17. In addition, the holder 30 holds the touch panel 12 in a state of covering the liquid-crystal module 17 from forward, by fixing the touch panel 12 onto the front with a double-faced tape (i.e., fixing member) 40, which will be described later on.

As illustrated in FIG. 2, the holder 30 includes a back portion 31, the front portion 32 facing the front surface of the back portion 31, a relay portion 33 relaying the back portion 31 and front portion 32, a middle portion 34 located in the middle of the back portion 31 and front portion 32, and an attaching member 35 attaching the middle portion 34 to the relay portion 33. The back portion 31, front portion 32, and relay portion 33 are structured as a single piece. The middle portion 34 is separate from the back portion 31, front portion 32, and relay portion 33, and is attached integrally to the relay portion 33 by the attaching member 35.

The back portion 31, the front portion 32, and the middle portion 34 extend in a direction (i.e., the Y- and X-directions) orthogonal to the direction where the wall 22 stands upright (i.e., the Z-direction). The back portion 31 and middle portion 34 are in contact with the wall 22 from its side, and thus holds and supports the wall 22. The back portion 31 has a back surface flush with the bottom 21. The front portion 32 is disposed between the front end of the wall 22 and the non-display portion 13 of the touch panel 12. Further, the front portion 32 is placed with a predetermined space interposed between the front portion 32 and the non-display portion 13 of the touch panel 12.

A back surface 13B of the non-display portion 13 and a front surface 32A of the front portion 32 face each other. The double-faced tape (i.e., fixing member) 40 is attached between the back surface 13B of the non-display portion 13 and the front surface 32A of the front portion 32. The double-faced tape 40 has adhesive front and back surfaces. The front surface of the double-faced tape 40 adheres to the back surface 13B of the non-display portion 13, and the back surface of the double-faced tape 40 adheres to the front surface 32A of the front portion 32. The double-faced tape 40 accordingly fix the touch panel 12 and the holder 30 together.

The adhesion between the double-faced tape 40 and the touch panel 12 is stronger than the adhesion between the liquid-crystal panel 11 and the touch panel 12. When the touch panel 12 includes a sensor sheet on its back, the double-faced tape 40 may be attached via the sensor sheet.

As illustrated in FIG. 3, two double-faced tapes 40 are attached on the two respective upper and lower opposite longer sides of the front portion 32 of the holder 30, and two double-faced tapes 40 are attached on the two respective right and left opposite shorter sides of the front portion 32 of the holder 30; that is, four double-faced tapes 40 in total are attached to constitute a frame shape as a whole. The two longer sides of the front portion 32 extend in the X-direction, and the two shorter sides of the front portion 32 extend in the Y-direction.

Figure 4:
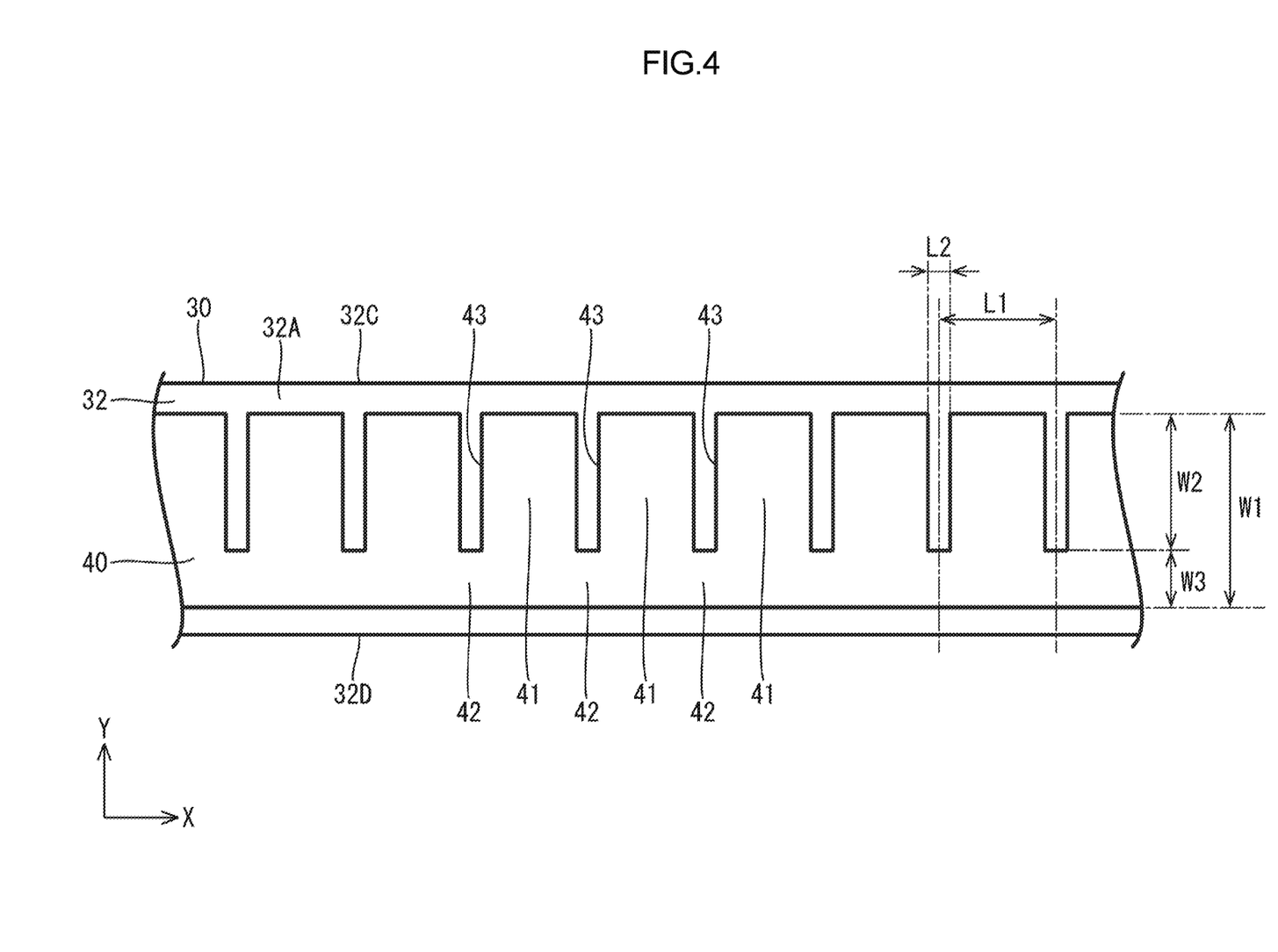
FIG. 4 is a partial enlarged front view of the holder and double-faced tape.

FIG. 4 is a partial enlarged view of the upper longer side of the front portion 32. The double-faced tape 40 includes multiple segments 41 continuously disposed in the direction where the upper longer side of the front portion 32 extends (i.e., the X-direction), includes joints 42 at which the adjacent segments 41 are joined, and includes slits 43 extending in a direction (i.e., the Y-direction) intersecting with the direction (i.e., the X-direction) where the upper longer side of the front portion 32 extends. The joints 42 are adjacent to an inner end 32D of the front portion 32. The joints 42 each have a width (i.e., distance in the Y-direction, that is, in the width direction of the double-faced tape 40) W3 smaller than a width W1 of the segment 41. Accordingly, a stress tends to relatively concentrate on the joint 42. The segments 41 are mutually separable by a break in the joint 42.

The slits 43 are arranged in the X-direction, and are long, narrow gaps extending from an outer end 32C of the front portion 32 toward the inner end 32D of the front portion 32. The joints 42 face parts of the gaps adjacent to the inner end 32D. Accordingly, the four double-faced tapes 40 are attached in such a manner that the slits 43 are adjacent to the outer end 32C of the front portion 32, and that the joints 42 are adjacent to the inner end 32D of the front portion 32, as illustrated in FIG. 3.

As illustrated in FIG. 4, the slits 43 extend to a half or more of a distance of the double-faced tape 40 (i.e., the width W1 of the double-faced tape 40) in a direction (i.e., the Y-direction) intersecting with the direction (i.e., the X-direction) where the front portion 32 extends. To be specific, a distance W2 of the gap or slit 43 in the Y-direction is about three-quarters of the width W1 of the double-faced tape 40. Here, the width W3 of the joint 42 is about a quarter of the width W1 of the double-faced tape 40. Moreover, a distance L1 between the two adjacent slits 43 exceeds a distance that is twice as great as a distance (i.e., slit width) L2 of the gap or slit 43 in the X-direction.

The following describes effects of this preferred embodiment. In this preferred embodiment, the liquid-crystal display (i.e., display device) 10 that includes the liquid-crystal module (i.e., display panel) 17 and the touch panel (i.e., cover panel) 12 covering the liquid-crystal module 17, includes the following: the holder 30 holding the touch panel 12 in a state of covering the liquid-crystal module 17; and the double-faced tape 40 disposed between the surface 13B of the touch panel 12 and the surface 32A of the holder 30 facing each other, the double-faced tape 40 fixing the touch panel 12 and the holder 30 together. The double-faced tape 40 includes a plurality of segments 41 continuously disposed in the direction where the holder 30 extends, the segments 41 being mutually separable.

If each panel (i.e., the liquid-crystal module 17 and the touch panel 12) deviates relatively, thus exerting a force by which the double-faced tape 40 is peeled, the aforementioned liquid-crystal display 10 is configured in such a manner that some of the segments 41 separate to peel, thereby preventing all the segments 41 (i.e., the entire double-faced tape 40) from peeling. In addition, the segments 41, which are continuously disposed in the direction where the holder 30 extends (i.e., direction along the outer end of the liquid-crystal module 17), can minimize the peeling of the double-faced tape 40 in the holder 30, while fixing the outer end of the liquid-crystal module 17, which tends to relatively exhibit peeling.

In this preferred embodiment, the double-faced tape 40 includes the joint 42 at which the adjacent segments 41 are joined, and the slit 43 extending in a direction intersecting with the direction where the holder 30 extends. In the aforementioned liquid-crystal display 10, if the double-faced tape 40 peels partly, the double-faced tape 40, which includes the slit 43 extending in the direction where the holder 30 extends (i.e., width direction), can tear in its width direction from the slit 43, thus facilitating separation of the segments 41. The adjacent segments 41 are joined together at the joint 42. The multiple segments 41 can be thus fixed to the holder 30 at one time. This improves workability in fixing the touch panel 12 and the holder 30 together with the double-faced tape 40.

In this preferred embodiment, the slit 43 extends from the outer end 32C of the holder 30 toward the inner end 32D of the holder 30. In the liquid-crystal display 10, if the double-faced tape 40 starts to partly peel from the outer end 32C, which relatively tends to peel, the slit 43 and joint 42 can tear from the outer end 32C toward the inner end 32D, thus separating the segments 41 suitably.

In this preferred embodiment, the slit 43 extends to a half or more of the distance W1 of the double-faced tape 40 in a direction intersecting with the direction where the holder 30 extends. In the aforementioned liquid-crystal display 10, the slit 43 and joint 42 tear easily when the double-faced tape 40 starts to peel partly.

In this preferred embodiment, the slits 43 are arranged in the direction where the holder 30 extends. In addition, the distance L1 between the adjacent slits 43 exceeds a distance that is twice as great as the width L2 of the single slit 43. The aforementioned liquid-crystal display 10 can minimize peeling of the double-faced tape 40 while keeping the fixing strength of the double-faced tape 40.

In this preferred embodiment, the display panel includes the liquid-crystal panel 11 containing liquid crystals, and the cover panel is the touch panel 12 capable of detecting a position where a position-input element F has performed position-input.

Second Preferred Embodiment

Figure 5:
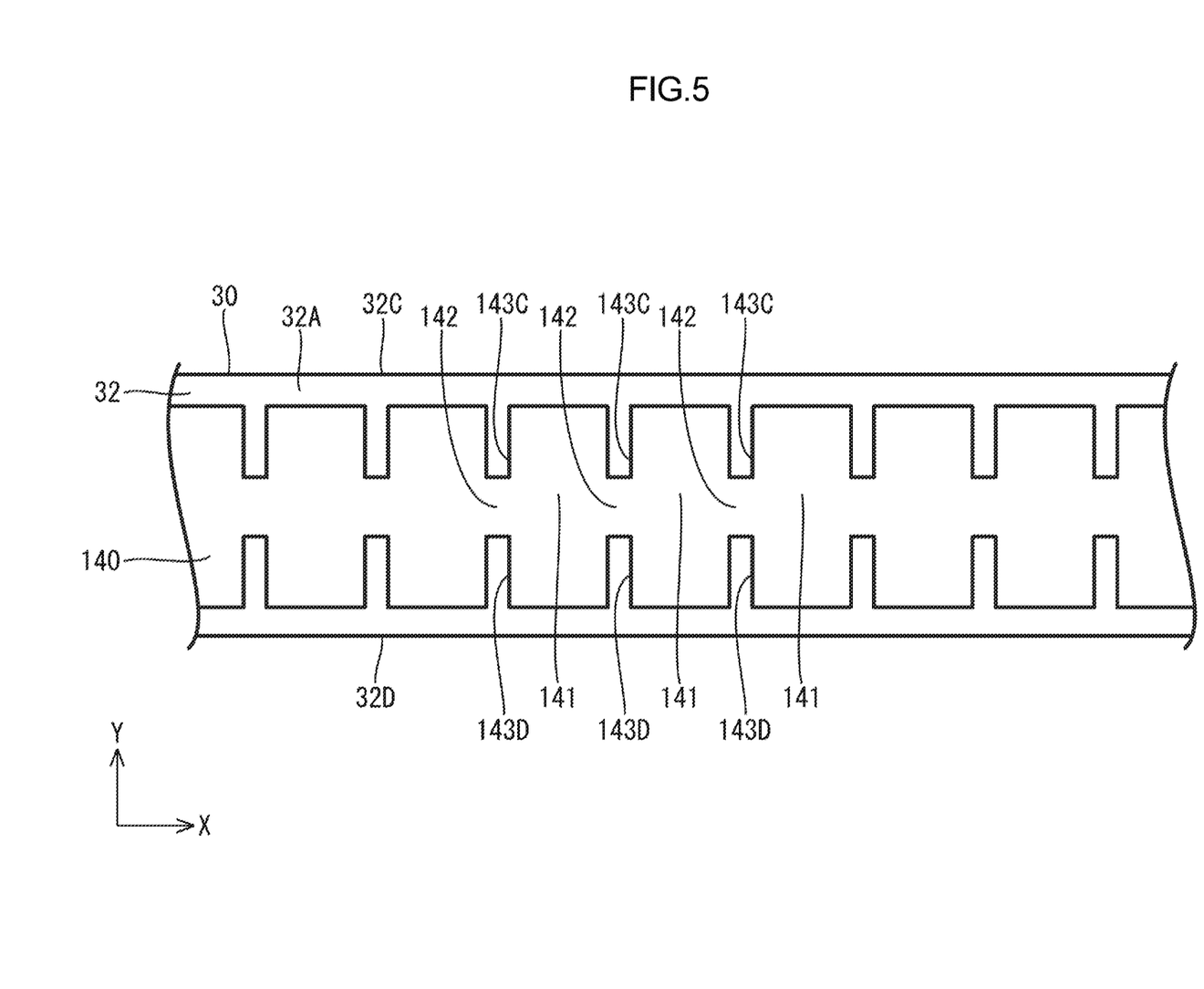
FIG. 5 is a partial enlarged front view of a holder and double-faced tape according to a second preferred embodiment.

The following describes a second preferred embodiment of the present invention with reference to FIG. 5. This preferred embodiment describes, by way of example, a liquid-crystal display having a double-faced tape whose configuration is different from that in the first preferred embodiment. In this preferred embodiment, the same components as those in the foregoing preferred embodiment are denoted by the same signs, and overlaps in structure, action, and effect will not be elaborated upon.

FIG. 5 is a partial enlarged view of the upper longer side of the front portion 32. A double-faced tape 140 includes multiple segments 141 continuously disposed in the direction where the upper longer side of the front portion 32 extends (i.e., the X-direction), includes joints 142 at which the adjacent segments 141 are joined, and includes slits 143C and 143D extending in a direction (i.e., the Y-direction) intersecting with the direction (i.e., the X-direction) where the upper longer side of the front portion 32 extends. The joints 142 are disposed in the middle of the double-faced tape 140 in its width direction (i.e., the Y-direction).

The slits 143C and 143D include outer slits 143C extending from the outer end 32C of the front portion 32 toward the inner end 32D of the front portion 32, and include inner slits 143D extending from the inner end 32D of the front portion 32 toward the outer end 32C of the front portion 32. The joints 142 are each disposed between the outer slit 143C and the inner slit 143D.

In this liquid-crystal display, if the double-faced tape 140 starts to peel from one of (or both of) the outer end 32C and inner end 32D, the slits 143C and 143D and the joint 42 can tear, thus separating the segments 141 suitably.

First Modification

Figure 6:
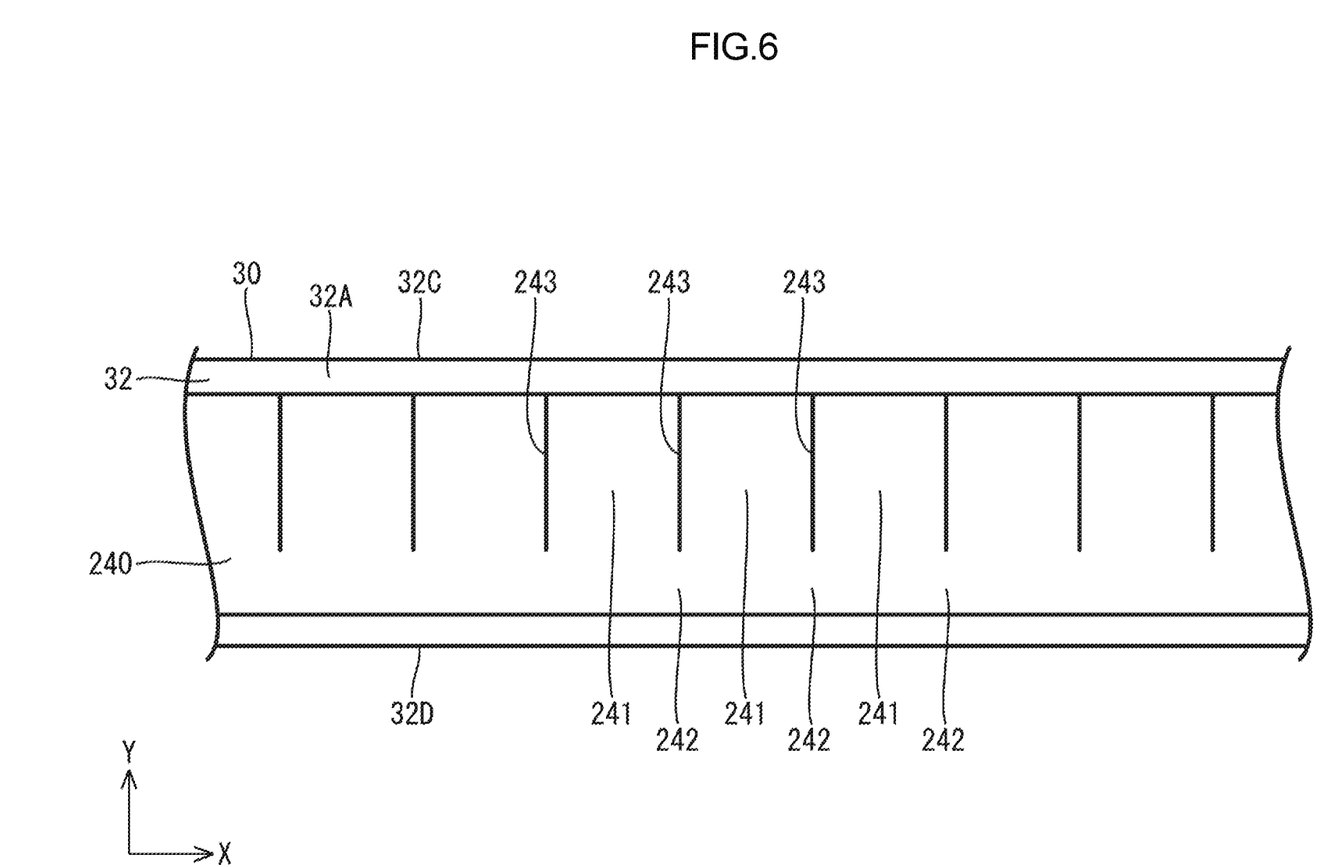
FIG. 6 is a partial enlarged front view of a holder and double-faced tape according to a first modification.

The following describes a first modification of the present invention with reference to FIG. 6. A double-faced tape 240 includes segments 241, joints 242, and slits 243. The slits 243 are cuts disposed in the width direction of the double-faced tape 240 (i.e., the Y-direction). The slits 243 each have a width (corresponding to the distance L2 in FIG. 4 in the first preferred embodiment) that is infinitely zero.

Second Modification

Figure 7:
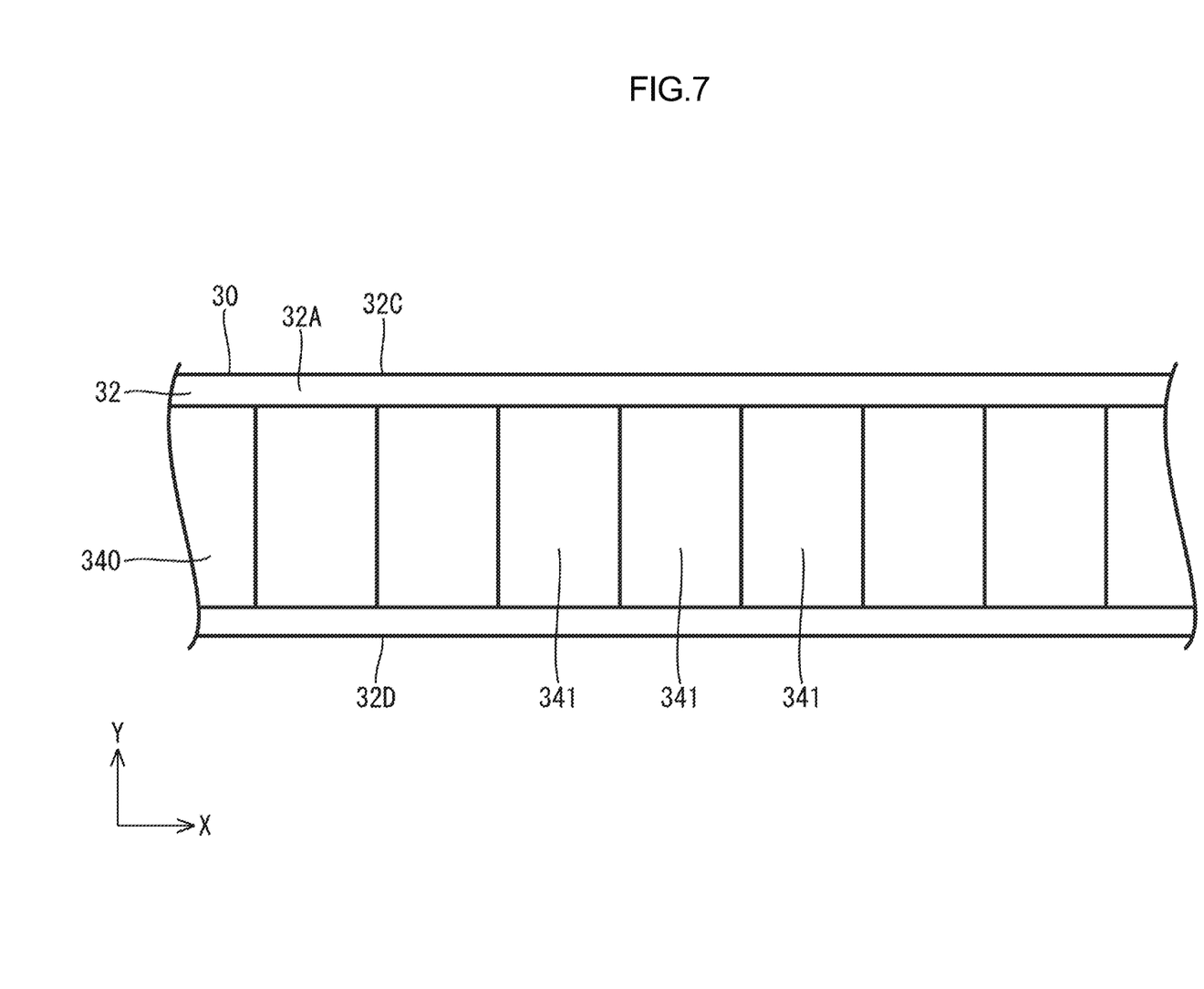
FIG. 7 is a partial enlarged front view of a holder and double-faced tape according to a second modification.

The following describes a second modification of the present invention with reference to FIG. 7. A double-faced tape 340 includes multiple segments 341 separable from one another. A single segment 341 is a rectangle whose longer sides extend in the width direction of the double-faced tape 340. The segments 341 are arranged in parallel in the direction where the front portion 32 extends (i.e., the X-direction), and thus constitute a strip as a whole. In other words, the double-faced tape 340 has multiple slits in the direction where the front portion 32 extends, in such a manner that the double-faced tape 340 is cut in its width direction.

Other Preferred Embodiments

The present invention is not limited to the foregoing preferred embodiments described in the aforementioned details and drawings. The technical scope of the present invention encompasses preferred embodiments described below for instance, and various modifications can be made without departing from the main points of the present invention.

(1) The cover panel, although being an out-cell touch panel in the foregoing preferred embodiments, may be in any form. For a liquid-crystal module that includes a liquid-crystal panel having an on-cell or in-cell touch panel (i.e., a position input unit), the cover panel may be a protective plate (such as a cover lens or cover glass) covering the liquid-crystal module from forward.

(2) The fixing member, although in the foregoing preferred embodiments, being a double-faced tape having adhesive front and back surfaces, may be in any form. For instance, the fixing member may be an adhesive in the form of a strip.

(3) Other than those described in the first preferred embodiment, the distance W2 of the gap or slit 43 in the Y-direction, the width W3 of the joint 42, the distance L1 between the two adjacent slits 43, and the slit width L2 can be changed as appropriate.

(4) The display panel, although being a liquid-crystal module in the foregoing preferred embodiments, may in any form. For instance, the display panel may be an organic EL module that includes an organic EL panel.

(5) Other than that described in the foregoing preferred embodiments, the shape of the display device can be changed as appropriate. In the foregoing preferred embodiments, the display device is, but not limited to, rectangular when viewed from the Z-direction. The display device may be circular or semi-circular for instance.

(6) The display device described in the foregoing preferred embodiments by way of example only, is not limited to a display device installed in a TV set. For instance, the display device can be installed in a mobile information terminal, an instrument panel for a vehicle, or other things.

What is claimed is:

1. A display device that includes a display panel and a cover panel covering the display panel, the display device comprising:
    a holder extending at least along an outer end of the display panel, the holder holding the cover panel in a state of covering the display panel; and
    a fixing member disposed between a surface of the cover panel and a surface of the holder facing each other, the fixing member fixing the cover panel and the holder together, wherein
    the fixing member comprises
        a plurality of segments continuously disposed in a direction where the holder extends, the plurality of segments being mutually separable,
        a plurality of joints, each of the plurality of joints joining the segments adjacent to each other, and
        a plurality of slits, each of the plurality of slits extending in a direction intersecting with the direction where the holder extends, and
    the plurality of slits comprises
        an outer slit extending from an outer end of the holder toward an inner end of the holder, and
        an inner slit extending from the inner end of the holder toward the outer end of the holder.

2. The display device according to claim 1, wherein each of the plurality of slits extends to a half or more of a distance of the fixing member in the direction intersecting with the direction where the holder extends.

3. The display device according to claim 1, wherein
    the plurality of slits is arranged in the direction where the holder extends, and
    a pair of the plurality of slits adjacent to each other are mutually distant by more than a distance that is twice as great as a width of at least one slit of the plurality of slits.

4. The display device according to claim 1, wherein
    the display panel comprises a liquid-crystal panel comprising a liquid crystal, and
    the cover panel comprises a touch panel capable of detecting a position where a position-input element has performed position-input.

5. A display device that includes a display panel and a cover panel covering the display panel, the display device comprising:
    a holder extending at least along an outer end of the display panel, the holder holding the cover panel in a state of covering the display panel; and
    a fixing member disposed between a surface of the cover panel and a surface of the holder facing each other, the fixing member fixing the cover panel and the holder together, wherein
    the fixing member comprises
        a plurality of segments continuously disposed in a direction where the holder extends, the plurality of segments being mutually separable,
        a plurality of joints, each of the plurality of joints joining the segments adjacent to each other, and
        a plurality of slits, each of the plurality of slits extending in a direction intersecting with the direction where the holder extends and
        extending to a half or more of a distance of the fixing member in the direction intersecting with the direction where the holder extends.

6. The display device according to claim 5, wherein each of the plurality of slits extends at least from an outer end of the holder toward an inner end of the holder.

7. The display device according to claim 5, wherein
    the plurality of slits is arranged in the direction where the holder extends, and
    a pair of the plurality of slits adjacent to each other are mutually distant by more than a distance that is twice as great as a width of at least one slit of the plurality of slits.

8. The display device according to claim 5, wherein
    the display panel comprises a liquid-crystal panel comprising a liquid crystal, and
    the cover panel comprises a touch panel capable of detecting a position where a position-input element has performed position-input.

9. A display device that includes a display panel and a cover panel covering the display panel, the display device comprising:

a holder extending at least along an outer end of the display panel, the holder holding the cover panel in a state of covering the display panel; and a fixing member disposed between a surface of the cover panel and a surface of the holder facing each other, the fixing member fixing the cover panel and the holder together, wherein the fixing member comprises a plurality of segments continuously disposed in a direction where the holder extends, the plurality of segments being mutually separable, a plurality of joints, each of the plurality of joints joining the segments adjacent to each other, and a plurality of slits, each of the plurality of slits extending in a direction intersecting with the direction where the holder extends, the plurality of slits arranged in the direction where the holder extends, and a pair of the plurality of slits adjacent to each other are mutually distant by more than a distance that is twice as great as a width of at least one slit of the plurality of slits.

10. The display device according to claim 9, wherein each of the plurality of slits extends at least from an outer end of the holder toward an inner end of the holder.

11. The display device according to claim 9, wherein the display panel comprises a liquid-crystal panel comprising a liquid crystal, and the cover panel comprises a touch panel capable of detecting a position where a position-input element has performed position-input.

* * * * *